United States Patent [19]

Wade

[11] Patent Number: 5,028,443

[45] Date of Patent: Jul. 2, 1991

[54] METHOD FOR CONTROLLING THE RIPENING OF FRESH PRODUCE

[75] Inventor: William Wade, Scituate, Mass.

[73] Assignee: Del Monte Fresh Fruit Company, Miami, Fla.

[21] Appl. No.: 225,277

[22] Filed: Jul. 28, 1988

Related U.S. Application Data

[62] Division of Ser. No. 887,079, Jul. 17, 1986, Pat. No. 4,779,524.

[51] Int. Cl.⁵ ............................................. B65D 81/20
[52] U.S. Cl. .................................. 426/312; 426/321; 426/419
[58] Field of Search ............... 426/419, 312, 316, 321, 426/396, 263

[56] References Cited

U.S. PATENT DOCUMENTS

| | | |
|---|---|---|
| 753,143 | 2/1904 | Kimmons . |
| 1,920,540 | 8/1933 | Winston et al. ......................... 99/11 |
| 1,927,100 | 9/1933 | Skinner ..................................... 99/2 |
| 2,000,637 | 5/1935 | Hatch ........................................ 99/2 |
| 2,063,628 | 1/1933 | Rutledge ................................ 99/103 |
| 2,095,455 | 10/1937 | Simonson ............................. 99/271 |
| 2,112,580 | 3/1938 | Skinner ................................. 99/103 |
| 2,213,582 | 9/1940 | Hall ......................................... 98/52 |
| 2,278,571 | 4/1942 | Skinner ................................. 99/148 |
| 2,577,421 | 12/1951 | Keller ................................... 99/103 |
| 3,620,765 | 11/1971 | McDonnel et al. ................. 99/103 |
| 3,627,393 | 12/1971 | Hickson et al. .................... 312/31.1 |
| 4,052,589 | 10/1977 | Wyatt ................................... 219/400 |
| 4,055,931 | 1/1977 | Myers .................................. 53/22 B |
| 4,066,401 | 1/1978 | Solomon ................................. 21/61 |
| 4,411,918 | 10/1983 | Ciminio et al. ..................... 426/124 |

Primary Examiner—Donald E. Czaja
Assistant Examiner—Evan Federman
Attorney, Agent, or Firm—Richard Kornutik

[57] ABSTRACT

In a method and apparatus for controlling the ripening of fresh fruit, a stack of fruit boxes is spiral wound with a transparent synthetic resin strip around the four vertically oriented faces of the box stack. The boxes within the stack have openings on their upper and lower faces which register with corresponding openings in vertically adjacent boxes to permit a vertical movement of an air-ethylene mixture through the stack. A plastic cap or lid is disposed on top of the stack of boxes and is provided with a blower for drawing air vertically through the stack from the bottom thereof. An air-conditioning unit and an ethylene containing bottle may be disposed in a unit on which a pallet supporting the stack of boxes rests. Effluent air or a mixture of air and ethylene is fed back to the air-conditioning unit via a conduit on the outside of the wrapped stack of boxes.

15 Claims, 2 Drawing Sheets

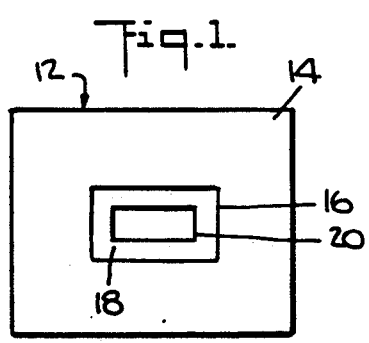
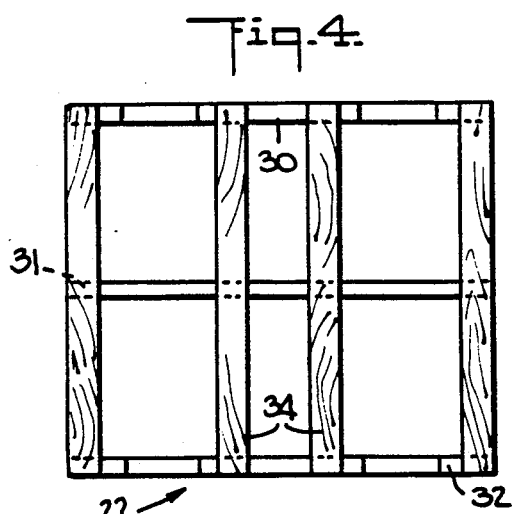
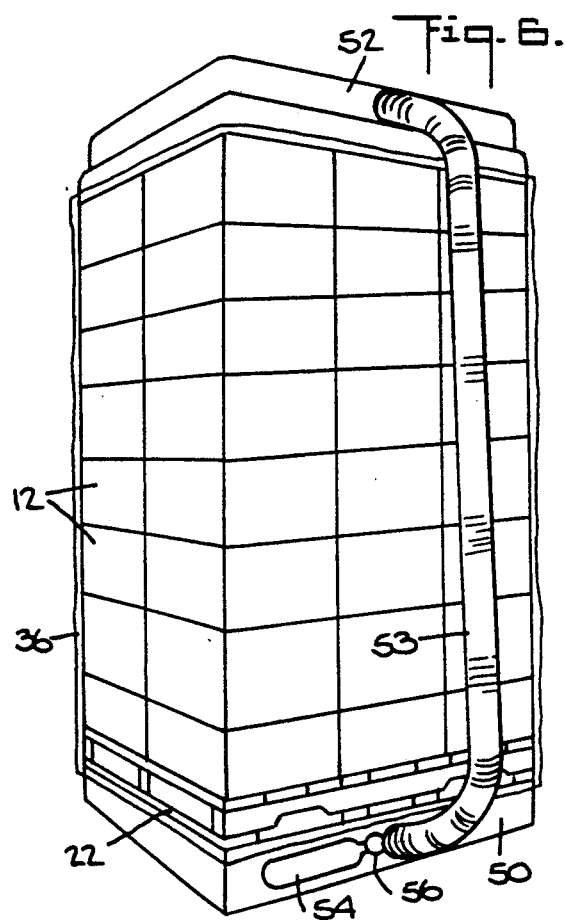
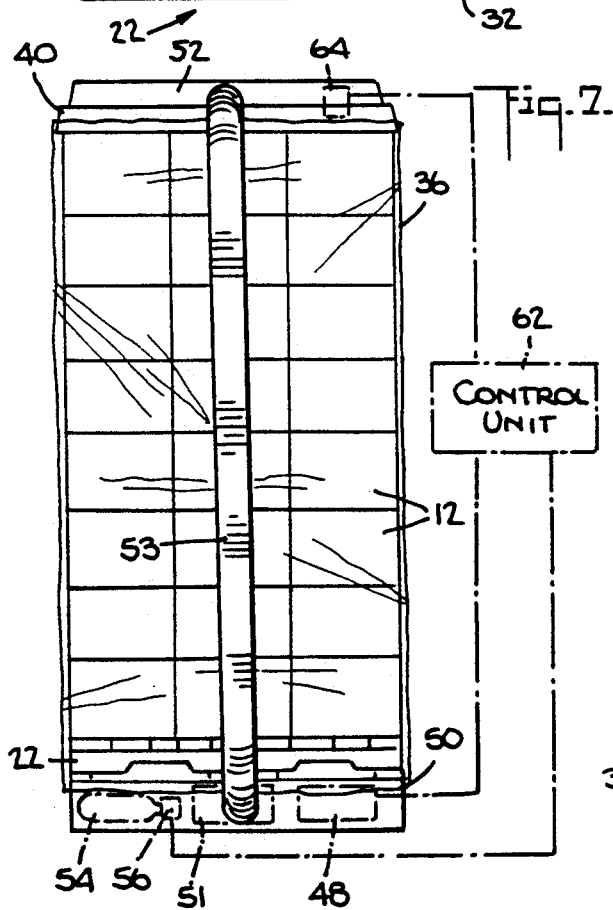
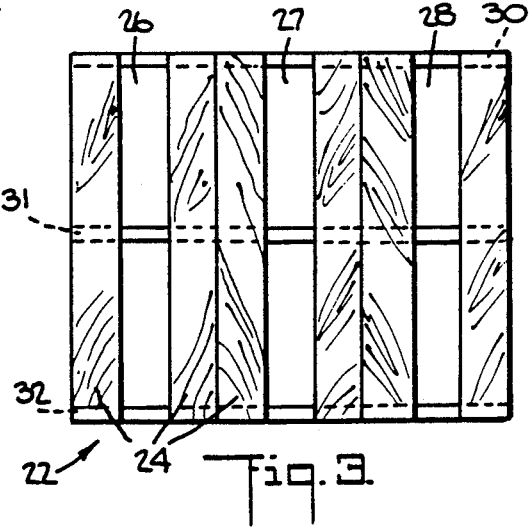
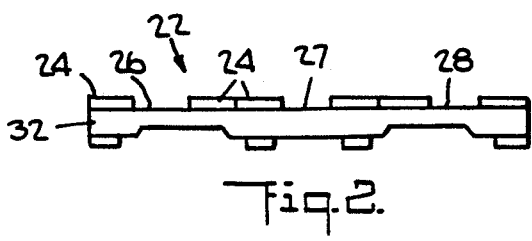

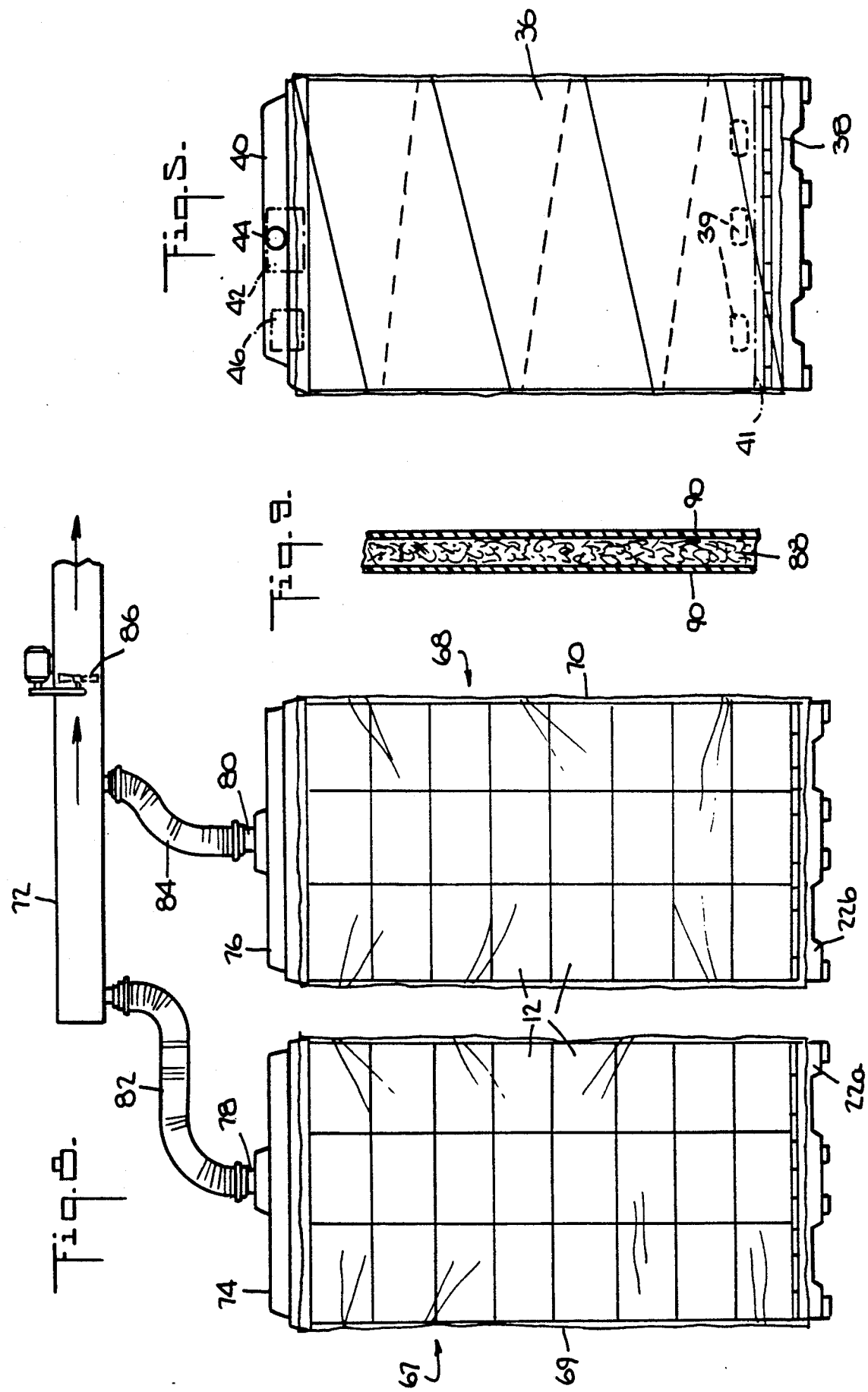

METHOD FOR CONTROLLING THE RIPENING OF FRESH PRODUCE

This is a division of application Ser. No. 887,079 filed July 17, 1986, now U.S. Pat. No. 4,779,524.

BACKGROUND OF THE INVENTION

This invention relates to a method and apparatus for controlling the ripening of fresh produce, particularly fruit such as bananas.

Boxes of bananas and other imported produce are usually transported from packing facilities to ships in non-air-conditioned trucks or railroad cars, transfer of the boxes being accomplished individually or in groups held by pallets. In the ships, the banana boxes are usually placed in refrigerated chambers wherein cool air is supplied through slotted decks and returned to cooling units located in spaces above the tops of the boxes. The boxes are generally stacked vertically so that the cool air can travel through vent slots from the bottoms to the tops of the boxes. On occasion the boxes of fruit are loaded into air-conditioned containers at the packing facilities and transported aboard special container ships.

Upon discharge from a ship, banana boxes are usually loaded directly into air-conditioned trucks or air-conditioned railroad cars for transport to ripening facilities, customers or processors. In the trucks, the conditioned air is generally supplied from a unit at the front of the trailer and is blown across the top of the load to the back of the trailer. Some trucks are provided with slotted floors which facilitate access of air to the bottoms of the boxes.

At processing facilities, the banana boxes are placed in specially designed ripening rooms provided with insulated, gas tight wall and roof panels. The rooms are generally 30 or 40 feet long and 10 to 15 feet wide and have heights accommodating stacks of boxes in racks of three tiers and two tiers or stacks of boxes without racks. Each room contains an air handling unit which cools or warms the air and which, by means of large fans, circulates the air around the room. The air flows across the boxes at the tops of the stacks and returns through the stacks to an intake of the air handling unit. The temperature of the air in such a room is controlled in accordance with a ripening schedule, and ethylene gas is dispersed in the room at a predetermined time to facilitate uniform ripening.

In the ripening rooms, the banana boxes are air stacked on pallets (i.e., disposed on pallets in stacks such that boxes in the same horizontal layer are spaced from each other) and placed in racks or on the floor. The boxes in a refrigerated container of bananas must be removed individually and air stacked on pallets placed on the floor of single tier ripening rooms or in racks.

In one pressure cooling system, a false end wall in a ripening room is provided with exhaust fans which create a low pressure plenum between rows of palletized boxes, the space between the boxes being covered with canvas material at the top and along an end opposite the fans. The conditioned air from the ripening room then travels horizontally through openings in the sides of the boxes, over the fruit therein and through the low pressure central plenum and the exhaust fans.

It is known in different applications to wrap stacks of boxes of dry goods with sheets of synthetic resin material to stabilize and lend rigidity to the stacks and to secure the boxes to underlying pallets. This same technique has been used on stacks of banana boxes for the same reasons, as well as for insulating the bananas from environments with especially low temperatures. To avoid defeating the insulation objective, any holes in the bottoms of the banaza boxes are blocked, thereby preventing the passage of air vertically through the banana box stacks.

An object of the present invention is to provide an improved method and apparatus for controlling the ripening of produce, particularly fruit such as bananas.

Another, more particular, object of the present invention is to provide such a method and apparatus with which palletized loads of fruit or other produce may be temperature controlled or ripened without restacking or individual handling of the boxes, and particularly without air stacking of boxes on pallets.

A further object of the present invention is to provide such a method and apparatus in which conditioned air may be provided in virtually any location, eliminating the necessity for air-conditioned warehouses or rooms.

Another object of the present invention is to provide such a method and apparatus in which a ripening room may be converted to pressure cooling with less expense than with known systems.

Yet another object of the present invention is to provide such a method and apparatus which enables the pressure cooling of produce in palletized boxes placed in racks.

SUMMARY OF THE INVENTION

A method for controlling the ripening of fresh produce, particularly fruit such as bananas, comprises, in accordance with the present invention, the steps of covering four vertically oriented faces of a stack of produce boxes from substantially the bottom to the top thereof with at least one substantially gas impermeable web and generating a vertical pressure gradient in the stack of boxes to force a gas preferably including temperature controlled air in a vertical direction through the stack. The boxes are each provided on an upper and a lower surface with openings registering with corresponding openings in vertically adjacent boxes. Gas access means are provided at the top and the bottom of the stack of boxes for allowing the passage of gas, particularly air, to and from the stack at the bottom and the top thereof.

In accordance with a particular feature of the present invention, the step of covering comprises the step of wrapping the stack of boxes in a gas-impermeable web or film along a substantially spiral path around the four vertically oriented faces of the stack. Preferably, the web is a sheet of transparent synthetic resin material and may include a layer of insulating material.

In accordance with another particular feature of the present invention, the step of generating the pressure gradient comprises the step of placing the wrapped stack of boxes into a chamber having an ambient air temperature lower than an average air temperature of the fresh produce in the boxes. Alternatively, the pressure gradient may be generated by mechanically moving the gas vertically through the wrapped stack of boxes. To this end, a blower is preferably disposed at the top of the stack of boxes, the blower being operated to draw the gas in an upward direction through the box stack. The blower may be mounted in a housing having an inlet port communicating with the boxes in an uppermost layer of the stack of boxes, the housing being sealed perimetrically to the web.

Pursuant to another feature of the present invention, the temperature of the gas (e.g., air) is controlled by disposing a heat exchanger preferably at the bottom of the stack of boxes and operating the heat exchanger to control the temperature of the gas. The effluent gas at the top of the stack is advantageously fed back to the heat exchanger. In the case that a heat exchanger, e.g., an air conditioning unit, is disposed at the bottom of the stack of boxes, the blower is preferably disposed also at the bottom of the stack.

Pursuant to further features of the present invention, the gas may comprise a mixture of air and ethylene and the stack of boxes is supported on a pallet provided with gaps registering with openings in the lower surfaces of boxes in a lowermost layer of the box stack.

As an alternative to an individual blower on a stack of boxes, an air-tight connection may be formed at the top of a stack of boxes with a portion of a manifold communicating with a blower, the manifold also being connected to at least one other stack of boxes covered on four vertically oriented faces with a gas-impermeable web.

In accordance with the invention, an apparatus for controlling the ripening of fresh produce, particularly fruit such as bananas, comprises a stack of boxes containing the fresh produce, at least one substantially gas-impermeable web covering four vertically faces of the stack of boxes from substantially the bottom to the top thereof, gas access ports at the bottom and top of the stack of boxes for allowing passage of a gas in a vertical direction through the stack, and a circulation system operatively connected to the stack of boxes at the bottom or top thereof for generating a vertical pressure gradient in the stack of boxes to force the gas in a vertical direction through the stack. Each of the boxes is provided on an upper and a lower surface with openings registering with corresponding openings in vertically adjacent boxes, thereby permitting the vertical movement of the gas.

Inasmuch as a modular or individual air-conditioning unit may be provided at the top or bottom of a stack of boxes, conditioned air may be provided in virtually any location, thereby eliminating the necessity for air-conditioned warehouses or rooms.

The present invention may be used in many existing warehouses or ripening rooms, with or without pallet racks and without the need for canvas covers or special seals at the floor and on the racks.

When used without the air-conditioning unit, the system in accordance with the invention promotes heat transfer in air-conditioned warehouses or ripening rooms by forcing air directly into contact with the produce inside the boxes. The method in accordance with the present invention makes the efficiency of cooling less dependent on existing air circulation in the ripening room or warehouse.

Conversion of a ripening room to pressure cooling will be less expensive with the system of the present invention than with other known systems.

The present invention is designed to economically handle produce in single pallet or partial pallet lots. The system is readily adaptable to existing warehouses, ripening rooms, trucks and ships, including rooms with standard drive-through racks.

BRIEF DESCRIPTION OF THE DRAWING

FIG. 1 is a top plan view of a typical box for holding fresh produce, particularly fresh fruit such as bananas.

FIG. 2 is a side elevational view of a pallet in accordance with the present invention, for holding a multiplicity of fruit boxes such as that illustrated in FIG. 1.

FIG. 3 is a top view of a upper array of boards in the pallet of FIG. 2.

FIG. 4 is a bottom view of a lower array of boards in the pallet of FIG. 2.

FIG. 5 is a side elevational view showing a stack of boxes wrapped along a spiral path with a transparent synthetic resin web in accordance with the invention.

FIG. 6 is a perspective view showing a system for controlling the ripening of produce particularly fresh fruit such as bananas, in accordance with the present invention.

FIG. 7 is a side elevational view of a system similar to that illustrated in FIG. 6.

FIG. 8 is a side elevational view of two spiral-wrapped stacks of boxes disposed on pallets and connected to an air circulation manifold, in accordance with the present invention.

FIG. 9 is a partial cross-sectional view through a multi-layer web utilizable in accordance with the present invention to wrap a stack of produce boxes.

DETAILED DESCRIPTION

As illustrated in FIG. 1, a box 12 for holding produce, particularly fresh fruit such as bananas, comprises a top surface or panel 14 provided with a central rectangular opening 16 and a lower surface or panel 18 similarly provided with a central rectangular opening 20.

As illustrated in FIGS. 2, 3 and 4, a pallet for carrying a multilayer and multicolumn stack of banana boxes 22 is provided on an upper side with a plurality of support boards 24 spaced to form three elongate gaps or openings 26, 27 and 28 which are alignable with the openings 20 in the lower surfaces or panels 18 of banana boxes 12. Each gap or opening 26, 27 and 28 communicates with the interiors of two boxes in a lowermost layer of a stack or array placed on pallet 22. Support boards 24 are connected via three elongate bars 30, 31 and 32 to four boards 34 disposed on a lower side of pallet 32. The number and positions of the boards on the lower side of pallet 32 are not significant. It is only necessary to have air access to gaps 26, 27 and 28.

Preferably, forty-eight boxes 12 are disposed on a pallet 22 in eight layers of six boxes each, as best seen in FIG. 6. The boxes are advantageously disposed on pallet 22 immediately after packing of the boxes and remain on the pallet during shipment and during a ripening process in accordance with the invention.

As illustrated in FIG. 5, an eight-layer stack of banana boxes is wrapped with a strip 36 of transparent synthetic resin material. Strip 36 is wound along a spiral path around four vertically oriented faces of the 48-box stack. The bottom edge 38 of the plastic sheet 36 is advantageously attached along its length to pallet 22. The attachment of bottom edge 38 to pallet 22 serves in part a stabilizing and rigidifying function and secures the stack of boxes to the pallet. However, in many applications, lower edge 38 need only cover the lowermost holes 39 in the sides of the lowermost layer of boxes, as indicated at 41.

At the top of the stack of boxes shown in FIG. 5 shown in FIG. 5 is disposed a unitary plastic cap or cover 40 which houses a blower 42. Cap 40 communicates with the interior of the boxes in an uppermost layer of the stack of boxes via the open lower face of the cap. During operation of blower 42, a vertical pressure gradient is generated in the stack of boxes, air entering the lowermost boxes through gaps 26, 27 and 28 and openings 20 in the lower panels of the lowermost boxes 12. Owing to the central location of openings 16 and 20 in upper and lower panels 14 and 18 of boxes 12, the openings in one box register with the openings of vertically adjacent boxes to allow the generation of a vertical stream of air during the operation of blower 42. Cap 40 is provided with an exhaust aperture 44 through which the blower or fan 42 exhausts air which has been drawn through the stack of boxes.

If a refrigerated warehouse or ripening room is available, cap or cover 40 may be omitted in some applications. In this case, the application of plastic wrap or strip 36 to the four vertically oriented faces of the stack of boxes and the disposition of the wrapped stack in a cool space induces a vertical chimney effect in the stack: warm air surrounding the fresh fruit rises through the stack of boxes and exits at the top thereof while cooler air from the refrigerated warehouse or ripening room in which the stack of boxes is disposed enters at the bottom of the stack.

Cap or cover 40 may be provided with a temperature sensor 46 such as a thermostat operatively connected to blower 42 for operating the blower to maintain the temperature of the air in the wrapped stack of boxes within a predetermined temperature range.

As illustrated in FIGS. 6 and 7, a ripening system in accordance with the invention may include an air-conditioning unit or heat exchanger 48 disposed in a modular housing 50 on which a pallet 22 carrying a stack of boxes 12 rests. A blower 51 is also disposed in housing 50 which housing communicates with a cap or cover 52 via a conduit 53.

As shown in FIGS. 6 and 7, a container 54 of ethylene attached to an outer surface of housing 50 (FIG. 6) or disposed within housing 50 (FIG. 7) is provided at an outlet with a valve 56 for dispersing ethylene gas into the air circulating through the stack of boxes 12. Preferably, container 54 holds a predetermined amount of ethylene which is completely released at one time. Valve 54 may be manually operated or, alternatively, actuated by a control unit 62 (FIG. 7).

Control unit 62 may be programmed to operate blower 51 and heat exchanger 48 to push or blow a stream of cool air vertically through the stack of boxes 12 and to return the stream of air, warmed by the fruit in boxes 12 to heat exchanger 48. At a predetermined time, valve 56 is operated manually or by control unit 62 to release a predetermined amount of ethylene gas from container or bottle 54 into the air stream circulating through the action of blower 51. Upon the lapse of a predetermined period of time, or upon the attainment of a predetermined temperature detected by a sensor 64, control unit 62 may act to de-energize heat exchanger 48. Generally, blower 51 continues to operate, while heat exchanger 48 is intermittently energizable by control unit 62 to control the temperature of air passing through the stack of fruit boxes.

It is to be noted that plastic wrap or strip 36 is advantageously connected around upper and lower edges to cap 40 and housing 50 in an air-tight manner.

In an alternative embodiment of the present invention illustrated in FIG. 8, two (or more) stacks 67 and 68 of boxes 12, wrapped in spiral fashion by respective transparent synthetic resin sheets 69 and 70 and disposed on respective pallets 22a and 22b, are provided on their top ends with respective caps 74 and 90 connected to an air circulation manifold 72 via respective flexible conduits or hoses 82 and 84. Caps or covers 74 and 76 are perimetrically sealed along lower edges to plastic sheets 69 and 70 and are connected via outlets 78 and 80 to flexible conduits 82 and 84. A blower 86 is disposed in manifold 72 for drawing air streams vertically through stacks 67 and 68 from the bottoms thereof to outlets 78 and 80. It is to be observed that the distances of plastic wraps 36, 69 and 70 from the vertical faces of the backs of boxes 12 have been exaggerated for purposes of illustration.

A stack of boxes in accordance with the present invention may be spiral wound with a multilayer web including, as illustrated in FIG. 9, a layer of insulating material 88 attached to one or more layers of synthetic resin material 90. Such a layered web is particularly useful in the system illustrated in FIGS. 6 and 7. Alternatively, in that system, two webs may be spiral wound around the stack of boxes 12, one web consisting of a sheet of synthetic resin material and the other web including a layer of insulating material. The insulation serves to maintain the temperature within the stack of boxes within a predetermined temperature range, despite differing or fluctuating ambient temperatures. It is to be noted that heat exchanger 48 may include heating coils as well as or in substitution for cooling coils of an air conditioning unit.

Although the invention has been described in terms of particular embodiments and applications, one of ordinary skill in the art, in light of this teaching, can generate additional embodiments and modifications without departing from the spirit of or exceeding the scope of the claimed invention. For example, it may be desirable in some situations to dispose a blower at the top end of a stack of boxes rather than at the bottom end thereof in the embodiment of FIGS. 6 and 7. Accordingly, it is to be understood that the drawings and descriptions herein are proffered by way of example to facilitate comprehension of the invention and should not be construed to limit the scope thereof.

What is claimed is:

1. A method for controlling the ripening of fresh produce, comprising the steps of:
providing a stack of boxes containing the fresh produce, each one of said boxes being formed on an upper and a lower surface with openings registering with corresponding openings in boxes vertically adjacent said one of said boxes;
covering four vertically oriented faces of said stack of boxes from the bottom to the top thereof with at least one substantially gas impermeable web;
providing gas access means at the bottom and the top of said stack of boxes and providing the passage of a gas to and from said stack of boxes at the bottom and the top thereof; and
generating a vertical pressure gradient in said stack of boxes to force said gas in a vertical direction through said stack of boxes by mechanically moving said gas vertically through the stack of boxes covered on said four vertically oriented faces;
disposing a blower at one of the bottom and the top of said stack of boxes, said step of mechanically moving comprising the step of operating said blower;
mounting said blower in a housing having an inlet port registering with an opening in one of an upper surface of an uppermost one of said boxes and a lower surface of a lowermost one of said boxes, said step of disposing the blower including the steps of positioning said housing on one of the bottom and the top of said stack of boxes and sealing said housing parametrically to said web.

2. The method set forth in claim 1 wherein said step of covering comprises the step of wrapping said gas impermeable web along a substantially spiral path around said four vertically oriented faces of said stack of boxes.

3. The method set forth in claim 2 wherein said web includes a sheet of synthetic resin material.

4. The method set forth in claim 3 wherein said web is transparent.

5. The method set forth in claim 3 wherein said web includes a layer of insulating material.

6. The method set forth in claim 1 wherein said blower is disposed at the top of said stack of boxes, said step of mechanically moving comprising the step of operating said blower and thereby drawing said gaseous mixture in an upward direction through said stack of boxes covered on said four vertically oriented faces.

7. The method set forth in claim 1 further comprising the step of controlling the temperature of said gas.

8. The method set forth in claim 7 wherein said step of controlling the temperature of said gas comprises the steps of disposing a heat exchanger at one of the bottom and the top of said stack of boxes and operating said heat exchanger to control the temperature of said gas.

9. The method set forth in claim 8, further comprising the step of feeding back an effluent gaseous mixture from the top to the bottom of said stack of boxes.

10. The method set forth in claim 1 wherein said stack of boxes is supported on a pallet provided with gaps registering with openings in the lower surfaces of lowermost ones of said boxes.

11. The method set forth in claim 1 wherein said gas is a gaseous mixture including air.

12. The method set forth in claim 11, further comprising the steps of disposing a container of ethylene at one of the bottom and the top of said stack of boxes and releasing ethylene from said container.

13. The method set forth in claim 1 wherein said produce constitutes bananas.

14. A method for controlling the ripening of fresh produce, comprising the steps of:
providing a stack of boxes containing the fresh produce, each one of said boxes being formed on an upper and a lower surface with openings registering with corresponding openings in boxes vertically adjacent said one of said boxes;
covering four vertically oriented faces of said stack of boxes from the bottom to the top thereof with at least one substantially gas impermeable web;
providing gas access means at the bottom and the top of said stack of boxes and providing the passage of a gas to and from said stack of boxes at the bottom and the top thereof; and
generating a vertical pressure gradient in said stack of boxes to force said gas in a vertical direction through said stack of boxes;
forming an airtight connection at one of the top and bottom of said stack of boxes between said gas impermeable web and a portion of a manifold communicating with a blower, said step of generating a pressure gradient comprising the step of operating said blower and thereby drawing said gas in one of an upward direction and downward direction through said stack of boxes covered on said four vertically oriented faces by said gas impermeable web.

15. The method set forth in claim 14 further comprising the steps of connecting said manifold to another stack of boxes covered on four vertically oriented faces with at least one gas-impermeable web.

* * * * *